US012561816B2

(12) United States Patent
Pollock et al.

(10) Patent No.: US 12,561,816 B2
(45) Date of Patent: Feb. 24, 2026

(54) MOTION CAPTURE USING CONCAVE REFLECTOR STRUCTURES

(71) Applicant: Electronic Arts Inc., Redwood City, CA (US)

(72) Inventors: James Ray Pollock, Vancouver (CA); Jan Michael Iguidez, Surrey (CA); Lisa Barr Dalmazzi, Vancouver (CA); Natalya Renée Lazarich, Coquitlam (CA)

(73) Assignee: Electronic Arts Inc., Redwood City, CA (US)

( * ) Notice: Subject to any disclaimer, the term of this patent is extended or adjusted under 35 U.S.C. 154(b) by 209 days.

(21) Appl. No.: 18/619,549

(22) Filed: Mar. 28, 2024

(65) Prior Publication Data

US 2025/0308038 A1 Oct. 2, 2025

(51) Int. Cl.
| | |
|---|---|
| *G06T 7/246* | (2017.01) |
| *G06T 7/73* | (2017.01) |
| *G06T 13/40* | (2011.01) |

(52) U.S. Cl.
CPC ................ *G06T 7/246* (2017.01); *G06T 7/73* (2017.01); *G06T 13/40* (2013.01); *G06T 2207/30196* (2013.01); *G06T 2207/30204* (2013.01); *G06T 2207/30221* (2013.01)

(58) Field of Classification Search
CPC .......... G06F 3/011; G06F 3/017; G06F 3/012; G06F 3/04815; G06F 3/014; G06F 3/0346; G06F 3/005; G06F 2203/012; G06F 3/0325; G02B 2027/014; G02B 27/0093; G06T 19/006; G06T 7/70; G06T 15/205; G06T 17/00; G06T 2207/10016; G06T 19/003; G06T 2207/30196; G06T 2207/30244; G06T 19/20; G06T 15/20; G06T 2200/08; G06T 2215/16; G06T 7/33; G06T 7/001; G06T 2207/30204; G06T 7/73; G06T 2207/30232; G06T 2207/20092; G06T 2207/30221; G06T 7/00; G06T 7/215; G06T 2200/04; G06T 13/00; G06T 13/20; G06V 40/25; G06V 40/23; G06V 40/20; A63F 13/213; A63F 13/25; A63F 13/98; A63F 2300/8082; A63F 13/00; A63F 2300/1087; A63F 13/428

See application file for complete search history.

(56) References Cited

U.S. PATENT DOCUMENTS

| | | | | |
|---|---|---|---|---|
| 12,039,751 B2 * | 7/2024 | Chen | .......................... | G06T 7/73 |
| 2006/0192854 A1 * | 8/2006 | Perlman | .................. | G01S 7/499 |
| | | | | 348/154 |
| 2010/0164862 A1 * | 7/2010 | Sullivan | .................... | G06T 7/73 |
| | | | | 345/156 |
| 2018/0089876 A1 * | 3/2018 | Alkouh | ..................... | G06T 7/20 |
| 2022/0092814 A1 * | 3/2022 | Eberspach | ............... | G06T 7/85 |
| 2022/0284628 A1 * | 9/2022 | Tuxen | .................. | H04N 23/695 |

* cited by examiner

*Primary Examiner* — Xiao M Wu
*Assistant Examiner* — Scott E Sonners
(74) *Attorney, Agent, or Firm* — Lee & Hayes, P.C.

(57) ABSTRACT

A system may perform motion capture using motion capture targets with concave reflector structures. For example, the motion capture target include a target body and a plurality of tracking markers located on respective portions of the surface of the target body. At least one tracking marker of the plurality of tracking markers may be a concave reflector structure including a tapered hole in the surface of the target body and at least a portion of a surface of the tapered hole may be reflective.

20 Claims, 8 Drawing Sheets

100

LIGHT SOURCE(S) 110

LIGHT SOURCE(S) 110

LIGHT FOR MOCAP 120

LIGHT FOR MOCAP 120

TAGS WITH CONCAVE REFLECTOR STRUCTURES 106

CONCAVE REFLECTOR STRUCTURES 116

SUBJECT 104

MOCAP PROP 118

REFLECTED LIGHT 112

CAMERA(S) 102

CAPTURED IMAGES 114

MOTION CAPTURE SYSTEM 108

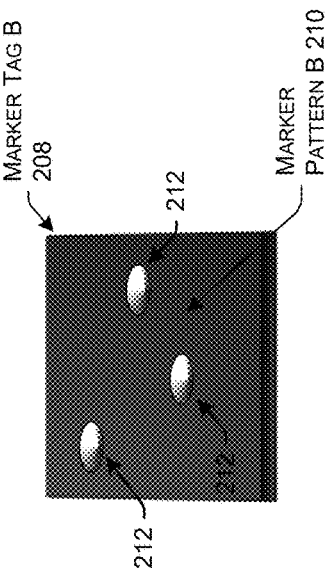
MARKER TAG B 208
MARKER PATTERN B 210
212
212
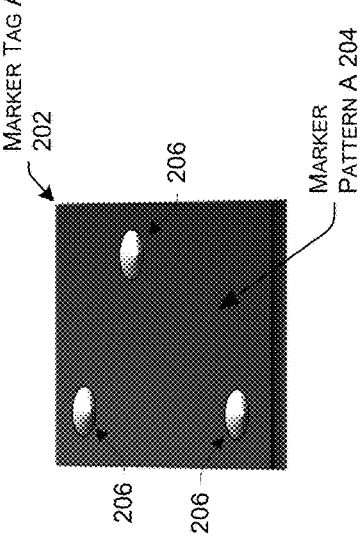
MARKER TAG A 202
MARKER PATTERN A 204
206
206
206
200
FIG. 2

400

410

408

406

402

404

600

CAPTURED IMAGE DATA OF REFLECTED IR LIGHT 602

SKELETAL MAPPING TO TAG LOCATIONS 606

PIXELS REPRESENTING TAGS WITH CONCAVE REFLECTOR STRUCTURES 604

PIXELS REPRESENTING CONCAVE REFLECTOR STRUCTURES 608

MAPPING OF PROP WITH CONCAVE REFLECTOR STRUCTURES IN CAPTURED IMAGE 610

700 ⟍

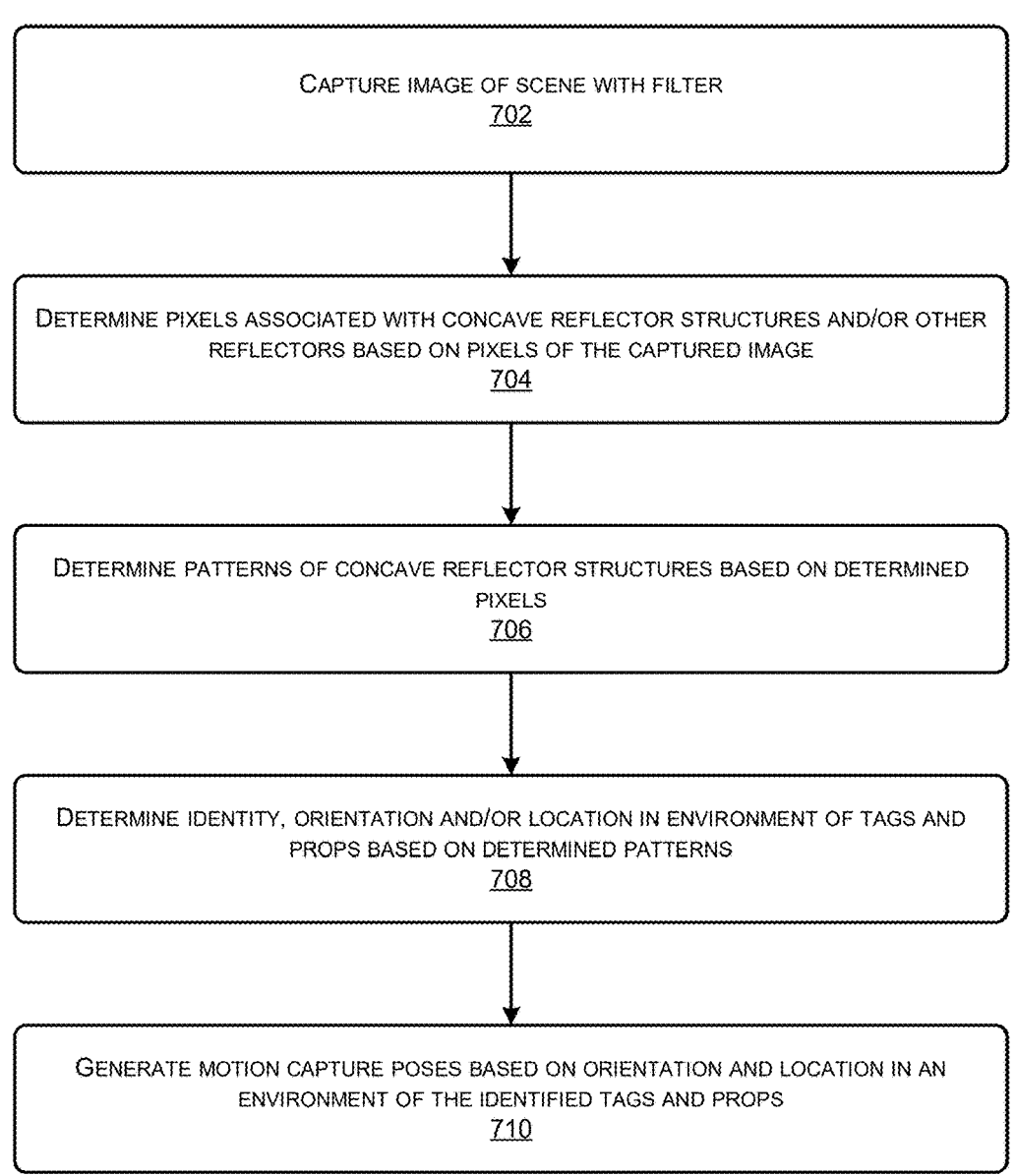

CAPTURE IMAGE OF SCENE WITH FILTER
702

DETERMINE PIXELS ASSOCIATED WITH CONCAVE REFLECTOR STRUCTURES AND/OR OTHER REFLECTORS BASED ON PIXELS OF THE CAPTURED IMAGE
704

DETERMINE PATTERNS OF CONCAVE REFLECTOR STRUCTURES BASED ON DETERMINED PIXELS
706

DETERMINE IDENTITY, ORIENTATION AND/OR LOCATION IN ENVIRONMENT OF TAGS AND PROPS BASED ON DETERMINED PATTERNS
708

GENERATE MOTION CAPTURE POSES BASED ON ORIENTATION AND LOCATION IN AN ENVIRONMENT OF THE IDENTIFIED TAGS AND PROPS
710

FIG. 7

800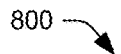
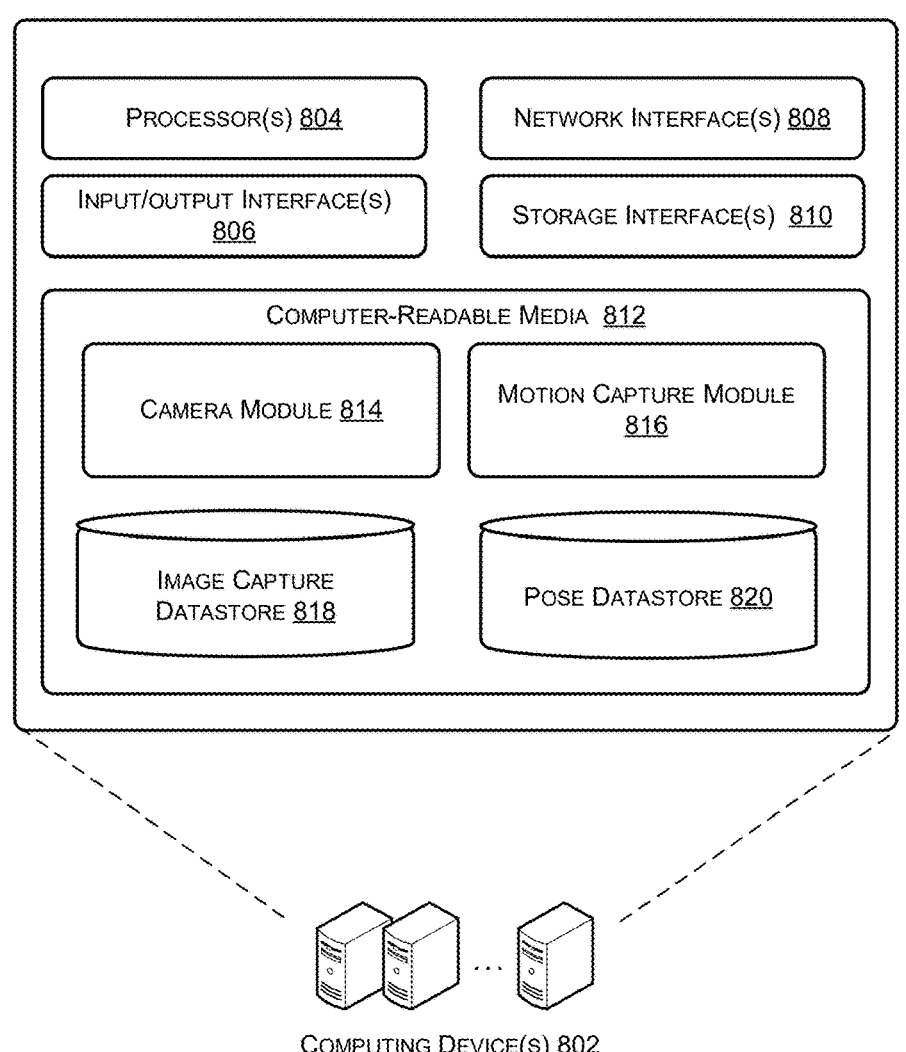
PROCESSOR(S) 804
NETWORK INTERFACE(S) 808
INPUT/OUTPUT INTERFACE(S) 806
STORAGE INTERFACE(S) 810
COMPUTER-READABLE MEDIA 812
CAMERA MODULE 814
MOTION CAPTURE MODULE 816
IMAGE CAPTURE DATASTORE 818
POSE DATASTORE 820
COMPUTING DEVICE(S) 802
FIG. 8

MOTION CAPTURE USING CONCAVE REFLECTOR STRUCTURES

BACKGROUND

In rendering, a character (used herein to also include other articulated objects) may be animated using skeletal animation. Skeletal animation may be produced based on motion captures of a subject (e.g., a person or animal). Producing motion captures of entities and then producing skeletal animations based thereon may require special settings or conditions which may be time consuming, expensive and/or otherwise burdensome.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 illustrates a schematic diagram of an example tags with groups of concave reflector structures, in accordance with example embodiments of the disclosure.

FIG. 7 illustrates a flow diagram of an example method for performing motion capture using light reflected by concave reflector structures, in accordance with example embodiments of the disclosure.

FIG. 8 illustrates a block diagram of an example system including one or more computing device(s) that may perform motion capture using concave reflector structures, in accordance with example embodiments of the disclosure.

DETAILED DESCRIPTION

Figure 1:
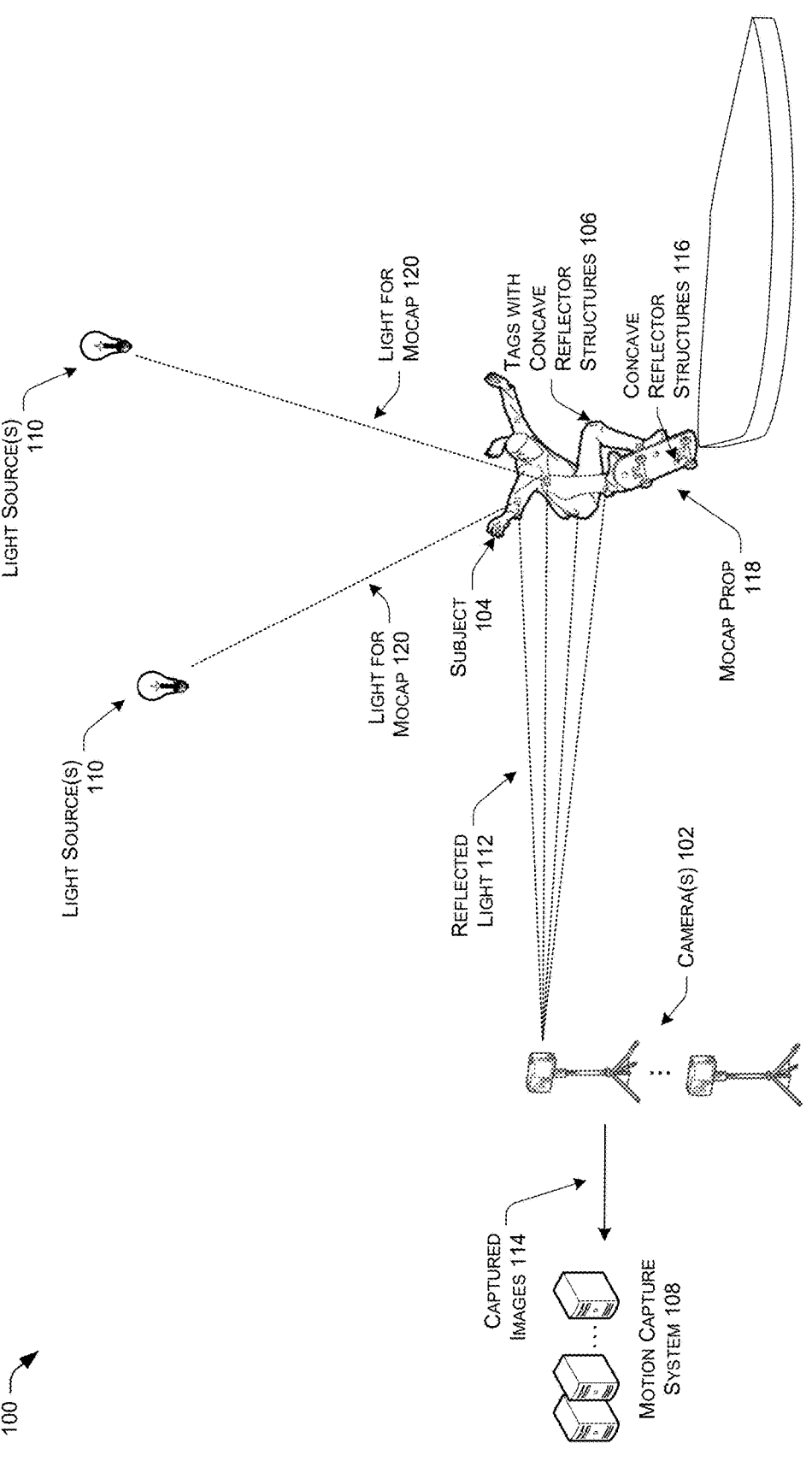
FIG. 1 illustrates an environment including camera(s) that may capture images of a subject for a motion capture system, in accordance with example embodiments of the disclosure.

Example embodiments of this disclosure describe methods, apparatuses, computer-readable media, and system(s) that may utilize objects with concave reflector structures as tracking markers (e.g., on props, tags, clothing, etc.) to perform motion capture.

Generally, motion capture may use cameras to capture the movement of a subject (e.g., an actor or object). In some examples, movement data may be generated based on tracking markers affixed to the subject. The markers may be placed on joint axes and/or rigid or bony landmarks. The markers can be associated with respective portions of a skeleton or structure of a simulated version of the subject (e.g., a simulated character or object). The data associated with the tracking markers for a given point in time may be utilized to generate a pose for a skeleton or structure of the simulated version of the subject. Changes in the pose of the skeleton or structure of the simulated version of the subject over time may be used to control the movements of a simulated version of the subject. As an example, based upon the motion captured position of markers associated with the human skeleton at a certain time instance, e.g. a specific frame, a computer model of the human may be posed in the same position.

Some examples according to this disclosure may perform motion capture based on images captured by a camera of a scene including prop(s), tag(s), clothing or the like with concave reflector structures thereon. More particularly, the captured images may include pixel data for light captured to generate the captured images. A motion capture pose may be generated based on the identified pixels in the captured image.

In some examples, a motion capture prop may be the "the object in play" of a sport or game that is the subject of the motion capture. Some sports or games may include athletes or players competing directly against others to reach a goal or record the shortest time in an event, but there are sports and games which have an "object in play." As used herein, an "object in play" may refer to a central item or element that is actively involved in the sport or game. This object may serve as a focal point for the players and determines the game's dynamics. The objects in play may often be a ball of some kind but are not limited thereto, such as in the case of a puck in ice hockey or a shuttlecock in badminton.

Depending on the example, the cameras may include filters or may otherwise be configured to capture light of particular frequency ranges or determine characteristics of light captured (e.g., frequency, wavelength, intensity, degree of linear polarization, angle of polarization, etc.). For example, some examples may utilize infrared light cameras which capture infrared light (IR) reflected from the objects to perform motion capture. For example, tracking markers that reflect IR light may be included on the props for the motion capture and subjects of the motion capture may wear clothing or accessories with tracking markers. Examples are not limited to the use of IR light reflectors or IR light for mocap. For example, tracking markers may reflect polarized light when exposed to environmental light (e.g., which may be uncontrolled and unpolarized) and the pixels of an image captured by a polarization camera may be filtered based on the degree of linear polarization of the captured light associated with the pixels. The filtered pixels may be utilized to determine pixels of the image associated with polarized tracking markers.

Depending on the prop, clothing or accessory material, tracking markers may be inset to the surface of the prop, clothing or accessory (e.g., as concave reflector structures). In some examples, external reflectors affixed to the prop, clothing or accessory may be utilized in addition to the concave reflector structures. Examples may further utilize tags affixed to, or otherwise on, the subject (e.g., on the prop, clothing or accessory) as tracking markers. For example, one or more tags with concave reflector structure(s) may be affixed to the clothing of a subject (or to a prop or accessory) as tracking marker(s). In a non-limiting example scenario, tags with concave reflector structures may be attached to the clothing of a subject (or to a prop or accessory) where the material or structure of the is object not suitable to have a concave reflector structures inset therein (e.g., cloth, thin, hollow, etc.).

In some examples, concave reflector structures or tags with concave reflector structures may allow for motion capture where external or protruding reflector would otherwise interfere with the motion capture. For example, external or protruding reflectors affixed to the surface of a hockey puck prop, a sword prop, the clothing of grappling mixed martial arts actors and so on may interfere with or obstruct movement or use during motion capture. For example, external or protruding reflectors affixed to the surface of a hockey puck may prevent the puck from sliding during use or the external or protruding reflector may be damaged when struck with a hockey stick. Further, changes to the object in play of a sport such as a hockey puck may affect have a negative effect on the ability of an actor to interact with the prop. For example, modifications to a hockey puck which change the weight, material or balance of the hockey puck may change the handling characteristics of the puck.

In some examples, the concave reflector structures on an object may include a tapered hole in the surface of the object with the surface within the tapered hole covered with or made of a reflective material having a reflective characteristic for the light being captured by the motion capture camera. For example, for a motion capture system using infrared light, a tapered hole may be made in the surface of an object and an infrared reflective material may be fixed to the interior surface of the tapered hole. A tapered hole may be a conically shaped hole as shown herein. However, examples are not limited to conical holes and may include ridged tapered holes, rounded tapered holes or similar holes which have walls angled inward as the hole goes deeper into the surface. The reflective material affixed to the interior surface of the tapered hole may include reflective tape, a reflective paint, or any other reflective material secured to the interior surface by adhesive, glue, mechanical fastener (e.g., screws, nails, tacks, etc.) or any other affixing or bonding structure or material.

In some examples, individual tags, props, or other objects may include groups of multiple concave reflector structures arranged in distinct patterns. For example, a tag may include three portions with a known distribution which is identifiably distinct from other groupings of concave reflector structures on other tags, props and other objects. Some examples may further analyze the pixels associated with the concave reflector structures to determine the orientation of the object. For example, based on the known arrangement of respective concave reflector structures of the tag and the detected relative locations of the concave reflector structures, some examples may determine an orientation of the group of concave reflector structures. Some examples may then utilize the orientation of the group of concave reflector structures in determining the orientation of the object or a portion of the object associated with the group of concave reflector structures (e.g., a prop or associated portions of the skeleton or structure of a simulated version of a subject).

The techniques and systems discussed herein may provide improvements to motion capture. Generally, motion capture with flat markers (e.g., stickers or LED lights) or markers that protrude from the surface of the tracked object (e.g., raised or affixed markers (e.g., spheres)) has suffered from various problems. As discussed above, motion capture with protruding markers, such as marker spheres affixed to the tracked object, may restrict the usage of props (e.g., sword blade cannot be sheathed, hockey puck cannot slide or be struck on the marker, markers interfere with the movement of grappling wrestlers being motion captured, tracking markers interfere with the usage of a mug or other object, etc.). The usage of flat markers, near flat markers or LED light markers may reduce the issues of protruding markers but may result in reduced visibility or narrow viewing angles for detection. Concave reflector structures may provide for motion capture without interfering with the usage of objects while providing increased visibility over flat markers, near flat markers or LED light markers (e.g., a subject may sheath a sword with concave reflector structures, a hockey puck with concave reflector structures can slide and be struck without damaging the markers, wrestlers wearing motion capture suits with concave reflector structures or tags with concave reflector structures may move freely without getting caught on protruding markers, a subject may pick up a mug or phone with concave reflector structures and manipulate the object naturally). These and other improvements to motion capture are discussed herein.

Certain implementations and embodiments of the disclosure will now be described more fully below with reference to the accompanying figures, in which various aspects are shown. However, the various aspects may be implemented in many different forms and should not be construed as limited to the implementations set forth herein. For example, while examples discussed herein may utilize a single camera, other examples may utilize multiple cameras. In addition, while discussed primarily herein in the context of a human subject, other examples may relate to the motion capture of other entities or object (e.g., an animal or machine model) and/or may relate to another portion of the model or the entire model. Moreover, embodiments may vary and are not limited in the computing devices or processors that may perform operations to perform motion capture and animations based thereon. It will be appreciated that the disclosure encompasses other variations of the embodiments, as described herein. Like numbers refer to like elements throughout.

FIG. 1 illustrates an environment 100 including camera(s) 102 that may capture images of a subject 104 for a motion capture system 108, in accordance with example embodiments of the disclosure. The camera 102 may capture images including light 120 emitted by the light sources 110 and reflected as reflected light 112 from motion capture markers (e.g., the concave reflector structures and/or other motion capture markers) to generate the captured images 114. In addition, the environment 100 may further include tags 106 with concave reflector structures affixed to the subject 104 and concave reflector structures 116 in the surface of the motion capture prop 118 as tracking markers. For example, tags 106 of one or more sizes may be attached to, or otherwise positioned on the surface of, various portions of the body of the subject 104 or the clothing thereof (e.g., face, hands, arms, legs, feet, torso, etc.). Although discussed in the context of tags on the subject 104 or clothing thereof, in some examples, tags with concave reflector structures may be affixed to motion capture props as well.

In operation, the subject 104 may perform motions to be captured in the field of view of the camera(s) 102. Light sources 110 may emit light 120 with characteristics to be captured by the camera(s) 102 after reflection from the motion capture markers as reflected light 112. Implementations are not limited to natural light or non-natural light as the type of light and/or light sources may vary depending on the type of light the camera(s) 102 are configured to detect (e.g., visible, infrared, etc.). Further, though the light sources 110 are illustrated as located away from the camera(s) 102, in some examples, one or more of the light source(s) 110 may be located proximate to, or integrated with, one or more of the camera(s) 102.

The motion capture marker(s) and/or the pattern(s) associated with the concave reflector structures or other markers from which the light 112 was reflected may be represented in the captured images 114.

The motion capture system 108 may analyze the pixels associated with the tracking markers (e.g., the pixels identified based on the intensity of captured IR light) in one or more images to determine locations of the tracking markers in the scene. In some examples, the motion capture system 108 may determine the locations of the tracking markers in the scene using the locations of the cameras and the relative positions of the tracking markers in a plurality of images. Further, the motion capture system 108 may track the markers from frame to frame in the frame to frame tracking to allow for the animation of a simulated model based on the motion of the tracking markers in the scene.

FIG. 2 illustrates a schematic diagram 200 of example tags with groups of concave reflector structures, in accordance with example embodiments of the disclosure. As discussed above, marker tag A 202 and marker tag B 208 include respective groups of concave reflector structures with distinct patterns, specifically marker pattern A 204 including concave reflector structures 206 and marker pattern B 210 including concave reflector structures 212.

The illustrated patterns of concave reflector structures and their distribution are exemplary and other or additional variations may be utilized in examples according to this disclosure. More particularly, the distinct patterns utilized and the criteria for determining the distinctions therebetween may vary depending on the overall motion capture system as a whole, such as the number of cameras, the number of camera angles, the number of light sources, the number of groups with distinct patterns, the shapes of the surfaces that the marker patterns will be the in or on (e.g., flat, rounded, irregular, etc.), and so on. For example, in a system with limited camera angles, the patterns may be arranged in a line with the relative spacing of the concave reflector structures providing identifiable distinction regardless of the distance to the markers. In another example, the system may utilize sufficient camera angles that location in a three-dimensional space can be ascertained allow for a two-dimensional patterns to be distinct using distance data. Additional variations and considerations would be apparent to one of ordinary skill in the art in view of this disclosure.

Moreover, in some examples, orientation information determined from distinct patterns of concave reflector structures may be utilized to determine orientation of the object the tag is affixed to. For example, using the locations of the tags and the tag identities of multiple tags affixed to the subject 104's arm in FIG. 1, the orientation of the lower arm may be identified with greater confidence than would be allowed by algorithms that simply track markers from frame to frame. For example, algorithms that track markers from frame to frame may confuse markers that intersect in the frame to frame tracking while examples using tags with known distributions of concave reflector structures may use the additional information to maintain tracking. Other variations and benefits would be apparent to one of ordinary skill in the art in view of this disclosure.

Figure 3:
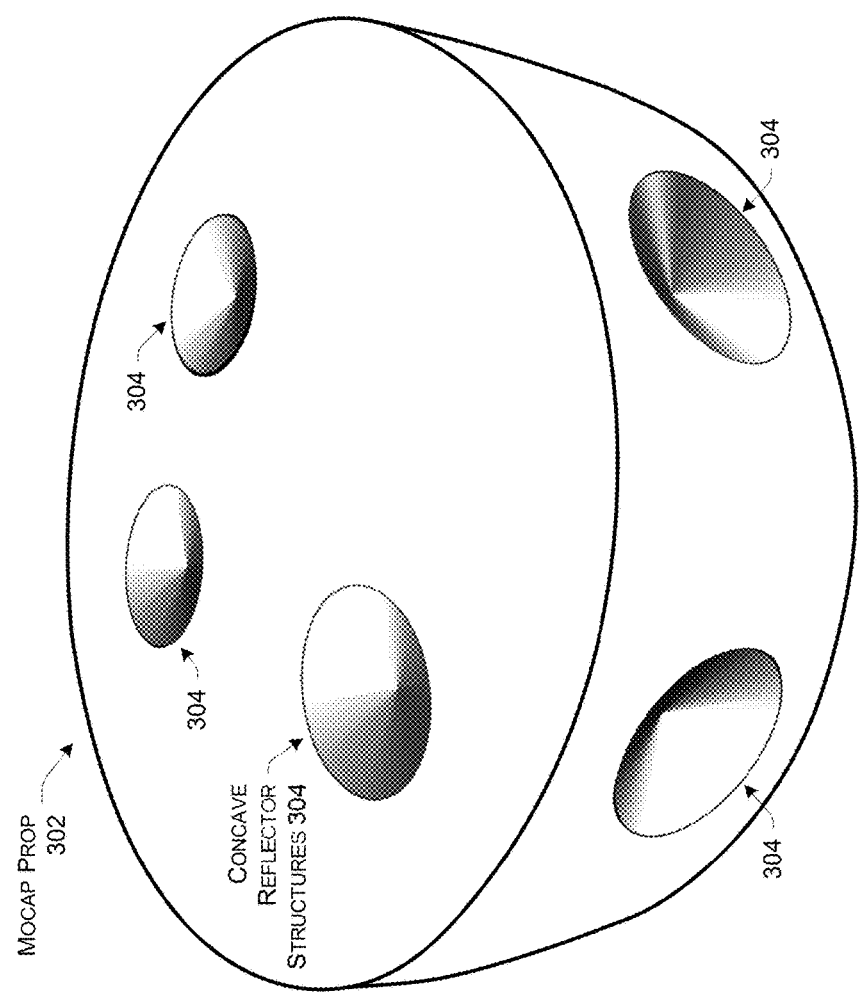
FIG. 3 illustrates a schematic diagram of an example motion capture prop, specifically a hockey puck, including concave reflector structures, in accordance with example embodiments of the disclosure.
Figure 4:
FIG. 4 illustrates a schematic diagram of example motion capture prop, specifically a sword prop, including concave reflector structures and external motion capture markers, in accordance with example embodiments of the disclosure.

Examples according to this disclosure are not limited to tags of the shape, form or patterns of concave reflector structures illustrated in FIGS. 1-4. For example, tags may be formed of any material which can hold the shape of the concave reflector structures on the surface. In some examples, the tags may be integrated into clothing or other portions of the subject. For example, the tags may be integrated into various locations on a sports uniform (e.g., an NFL Jersey), sports equipment (e.g., a helmet, a baseball bat, a hockey stick, etc.), on an actor, on cars in F1 and so on. FIGS. 3 and 4 illustrate the integration of concave reflector structures into other objects.

FIG. 3 illustrates a schematic diagram 300 of an example motion capture prop 302, specifically a hockey puck prop, including concave reflector structures, in accordance with example embodiments of the disclosure. As discussed above, the motion capture prop 302 includes a plurality of concave reflector structures 304 arranged on the motion capture prop such that cameras arranged around a scene being motion captured are able to track the hockey puck as it moves. As illustrated, the concave reflector structures 304 may be tapered holes in the surface of the motion capture prop that are coated with a material that reflects the light emitted by the light sources of the motion capture system. Additional detail on the structure of example concave reflective structures is provided with regard to FIG. 5.

As discussed above, the concave reflector structures 304 may allow for the motion capture prop 302 to be used as a hockey puck for motion capture without having the tracking markers interfere with the movement of the hockey puck across the floor and/or the ability of the players to control the hockey puck. Further, the concave reflector structures 304 may provide superior visibility for the motion capture system in comparison to flat markers, near flat markers or LED light markers.

FIG. 4 illustrates a schematic diagram 400 of example motion capture prop 402, specifically a sword prop, including concave reflector structures and external motion capture markers, in accordance with example embodiments of the disclosure. As illustrated, the motion capture prop 402 includes a plurality of concave reflector structures arranged in a first group 404, a second group 406, and a third group 410. The motion capture prop 402 further includes external tracking markers, specifically reflective spheres 408 affixed to the cross guard of the sword.

As discussed above with regard to the tags 202 and 208, the concave reflector structures of the groups 404, 406 and 410 may be arranged into distinct patterns to allow for identification of the portion of the sword the pixels of the captured image are associated with. More particularly, the pattern of the group of concave reflector structures 404 may be associated with the tip of the blade of the sword, the pattern of the group of concave reflective structures 406 may be associated with the base of the blade, and the pattern of the group of concave reflector structure 410 may be associated with the base of the of the sword. As discussed above, the inclusion of concave reflective structures in groups 404 and 406 may allow for the sword blade of the prop 402 to be sheathed and unsheathed normally. Further, the external reflective spheres 408 may be visible at times when the concave reflective structures of the group 410 are obscured by a wielder's hand while being positioned such that the external reflective spheres will not interfere with usage of the sword by the wielder.

Figure 5:
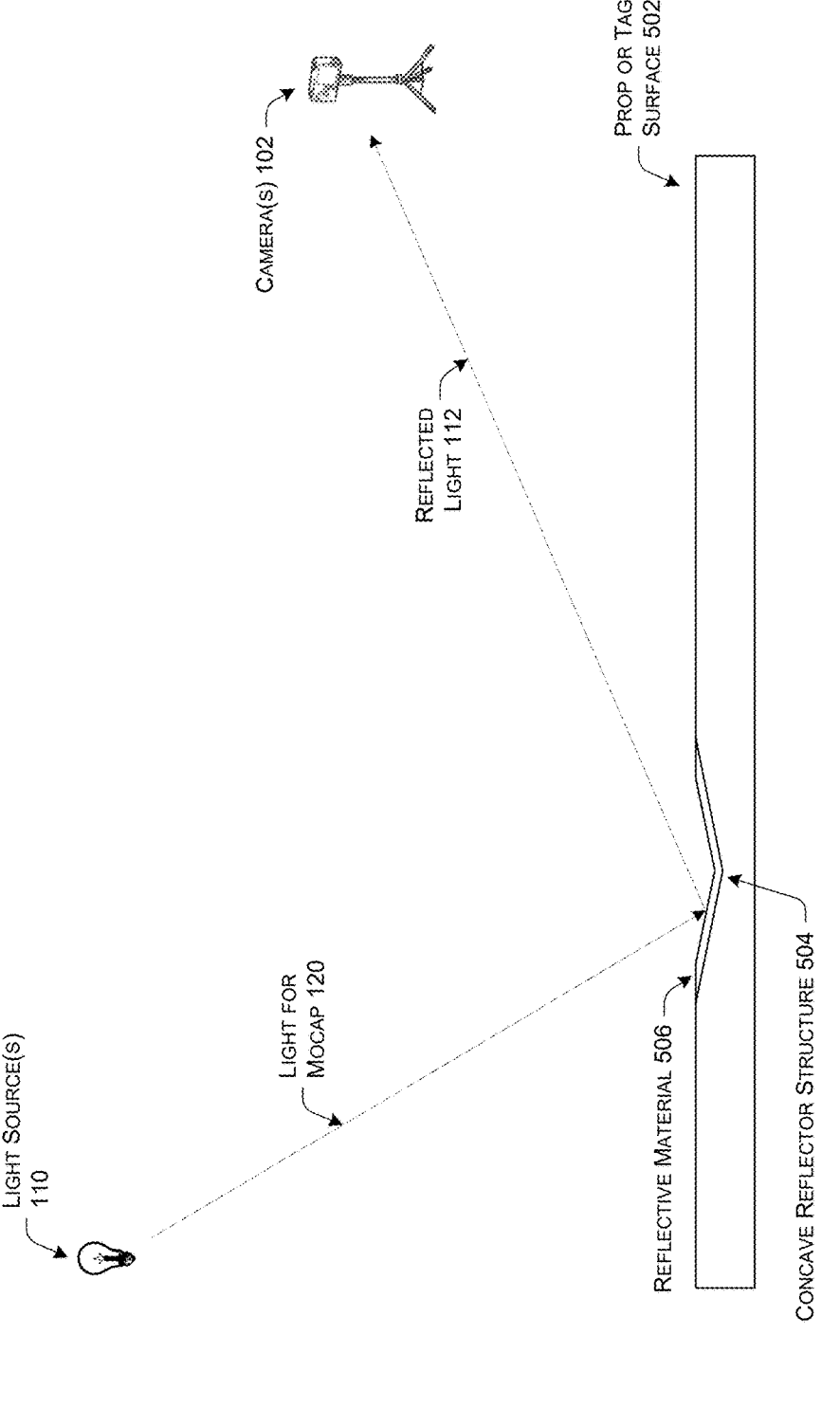
FIG. 5 illustrates a schematic diagram of an example surface of an object for motion capture that includes concave reflective structures, in accordance with example embodiments of the disclosure.

FIG. 5 illustrates a schematic diagram 500 of an example surface of an object for motion capture that includes concave reflective structures, in accordance with example embodiments of the disclosure.

As illustrated, a prop or tag surface 502 may include a concave reflective structure. In some examples, the concave reflector structure 504 on an object may include a tapered hole in the surface 502 of the object. Further, the surface within the tapered hole may be covered with or made of a reflective material 506 having a reflective characteristic for the light being captured by the motion capture camera 102. For example, for a motion capture system using infrared light, a tapered hole may be made in the surface of an object and an infrared reflective material may be fixed to the interior surface of the tapered hole. A tapered hole may be a conically shaped hole as shown in FIG. 5. However, examples are not limited to conical holes and may include ridged tapered holes, rounded tapered holes or similar holes which have walls angled inward as the hole goes deeper into the surface. The reflective material 506 affixed to the interior surface of the tapered hole may include reflective tape, a reflective paint, or any other reflective material secured to the interior surface by adhesive, mechanical fastener (e.g., screws, nails, tacks, etc.) or any other affixing or bonding structure or material.

In operation, the light source(s) 110 may emit light 120 for motion capture which may reflect from the reflective material 506 of the concave reflector structure 504 as reflected light 112. The reflected light may then be captured by the camera(s) 102 for use in motion capture. For example, a motion capture pose may be generated based on the identified tracking markers, such as concave reflector structure 504, in the captured image.

Figure 6:
FIG. 6 illustrates an example of determining a motion capture pose using pixels of a captured image of a scene including a motion capture subject and a motion capture prop, in accordance with example embodiments of the disclosure.

FIG. 6 illustrates an example 600 of determining a motion capture pose using pixels of a captured image of a scene including a motion capture subject and a motion capture prop, in accordance with example embodiments of the disclosure. More particularly, each pixel of the captured image 602 illustrated in FIG. 6 may include the captured image data of reflected IR light. The visual image of the subject and motion capture prop is overlaid to ease understanding of the FIG.

As discussed above, the example 600 represents the intensity of detected IR light of the pixels such that the pixels representing tags and concave reflector structures are shown while pixels not corresponding to tags may be filtered out (e.g., due to having less than a threshold degree of intensity in the wavelength of IR light being emitted by the light source(s)). Of course, while the entirety of tags 604 are illustrated, this is for ease of illustration and understanding as the captured images would include pixels for the tracking markers on the tags 604, not the bodies of the tags as a whole. As discussed above, the pixels representing tags with concave reflector structures 604 and the pixels representing concave reflector structures of the motion capture prop 608 may be utilized to determine a motion capture pose (e.g., a skeletal mapping to the tag locations 606 and the mapping of the prop to the concave reflector structures 610 in the captured image).

The determination of the motion capture pose from pixels determined to correspond to tracking markers (e.g., tags with concave reflector structures and concave reflector structures of the motion capture prop) may be performed using techniques that would be understood by one of ordinary skill in the art in view of this disclosure. Further, in examples utilizing multiple cameras, the determination of the motion capture pose may be performed using techniques that would be understood by one of ordinary skill in the art in view of this disclosure for combining the position information from images captured by the multiple cameras to determine the location of the tracking markers in the environment. Further, the motion capture system may utilize the locations of the tracking markers or the poses determined based thereon to determine the interactions of tracked objects in the scene.

In addition or alternatively, the determination of the motion capture pose from pixels determined to correspond to the tracking markers may be performed based on additional information (e.g., patterns associated with groups of concave reflector structures). For example, the motion capture system 108 may further analyze the pixels associated with the tracking markers (e.g., the pixels identified based on the intensity of captured IR light) to determine groups of pixels associated with the groups of concave reflector structures. Based on the known arrangement of respective concave reflector structures of the groups of concave reflector structures, some examples may determine an orientation of the tag, subject or prop associated with the group of concave reflector structures. For example, a motion capture system may utilize the orientation of the group of concave reflector structures in determining the orientation of one or more associated portions of the skeleton or structure of a simulated version of the subject or prop.

Some examples may additionally or alternatively utilize the identification of the group of concave reflector structures in determining that the group of concave reflector structures is associated with a respective portion of the skeleton or structure of a simulated version of the subject or prop (e.g., the associated joint or landmark).

FIG. 7 illustrates a flow diagram of an example method 700 for performing motion capture using light reflected by concave reflector structures, in accordance with example embodiments of the disclosure. The method 700 may be performed by the system of FIG. 1 as discussed above.

At block 702, the camera may capture image(s) for the light reflected from the concave reflector structures. Next, at block 704, the motion capture system may determine pixels of the captured image associated with concave reflector structures and/or other reflectors based on pixels of the captured image.

At block 706, the motion capture system may determine patterns of concave reflector structures based on determined pixels. At block 708, the motion capture system may determine the identity, orientation and/or location in the environment of the tags and/or props based on the determined pixels (e.g., as discussed above with respect to FIGS. 1-6). Then, at block 710, the motion capture system may generate motion capture poses based on the determined orientation(s) and/or location(s) in the environment of the identified tags and props.

Following block 710, the system may output the motion capture pose for use in animation and the process may repeat for new captured images.

It should be noted that some of the operations of method 700 may be performed out of the order presented, with additional elements, and/or without some elements. Some of the operations of method 700 may further take place substantially concurrently and, therefore, may conclude in an order different from the order of operations shown above. Further, implementations are not limited to the details of the above examples and variations are possible. Moreover, while the implementations discussed above may perform motion capture of a particular subject for a respective model, implementations are not so limited. For example, some implementations may perform motion capture for multiple subjects or objects. In some examples, other objects such as a batt or a ball may be subject to motion capture by including groups of concave reflector structures on the other objects. This may allow for motion capture of combinations of subject(s) and/or object(s), potentially in conjunction, by separating tracking markers by subject or object and performing motion capture for each subject or object as discussed above, then combining the captured motion of the subject(s) and/or object(s).

FIG. 8 illustrates a block diagram of an example system 800 including one or more computing device(s) 802 that may perform motion capture using concave reflector structures, in accordance with example embodiments of the disclosure. The computing device(s) 802 may include one or more processor(s) 804, one or more input/output (I/O) interface(s) 806, one or more network interface(s) 808, one or more storage interface(s) 810, and computer-readable media 812.

In some implementations, the processors(s) 804 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 804 may possess its own local memory, which also may store program modules, program data, and/or one or more operating system(s). The one or more processor(s) 804 may include one or more cores.

The one or more input/output (I/O) interface(s) 806 may enable a user to interact with a user interface module (e.g., to provide input to and receive output from a user application operating on the system 800). The I/O interface(s) 806 may include a combination of hardware, software, and/or firmware and may include software drivers for enabling the operation of any variety of I/O device(s) integrated on the system 800 or with which the system 800 interacts, such as displays, microphones, speakers, cameras, switches, and any other variety of sensors, or the like.

The network interface(s) 808 may enable the system(s) 800 to communicate via the one or more network(s). The network interface(s) 808 may include a combination of hardware, software, and/or firmware and may include software drivers for enabling any variety of protocol-based communications, and any variety of wireline and/or wireless ports/antennas. For example, the network interface(s) 808 may comprise one or more of a cellular radio, a wireless (e.g., IEEE 802.1x-based) interface, a Bluetooth® interface, and the like. In some embodiments, the network interface(s) 808 may include radio frequency (RF) circuitry that allows the system(s) 800 to transition between various standards. The network interface(s) 808 may further enable the system (s) 800 to communicate over circuit-switch domains and/or packet-switch domains.

The storage interface(s) 810 may enable the processor(s) 804 to interface and exchange data with the computer-readable media 812, as well as any storage device(s) external to the system(s) 800, such as the camera(s) 102.

The computer-readable media 812 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 812 may be implemented as computer-readable storage media (CRSM), which may be any available physical media accessible by the processor(s) 804 to execute instructions stored on the computer-readable media 812. In one basic implementation, CRSM may include RAM and Flash memory. In other implementations, CRSM may include, but is not limited to, ROM, EEPROM, or any other tangible medium which can be used to store the desired information and which can be accessed by the processor(s) 804. The computer-readable media 812 may have an operating system (OS) and/or a variety of suitable applications stored thereon. The OS, when executed by the processor(s) 804 may enable management of hardware and/or software resources of the system(s) 800.

Several functional blocks having instruction, data stores, and so forth may be stored within the computer-readable media 812 and configured to execute on the processor(s) 804. The computer-readable media 812 may have stored thereon the camera module 814, the motion capture module 816, the image capture datastore 818, and the pose datastore 820. It will be appreciated that each of the functional blocks may have instructions stored thereon that when executed by the processor(s) 804 may enable various functions pertaining to the operations of the system(s) 800. For example, the camera module 814 may operate to control the camera(s) to capture image data and store the captured image data in the image capture datastore 818. The motion capture module 816 may operate to identify pixels in images stored in the image capture data store 818 representing tracking markers, groups of concave reflector structures and/or associations to portions of the subject or prop the tracking markers are associated with. The motion capture module 816 may further operate to determine poses for computer model(s) of the subject(s) or prop(s) based on the identification of pixels representing tracking markers as discussed above. The resulting poses may be stored in the pose database 820 for use in animation.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
a motion capture target comprising:
 a target body;
 a plurality of tracking markers located on respective portions of a surface of the target body and associated with respective portions of a simulated model, wherein:
  at least one tracking marker of the plurality of tracking markers is a concave reflector structure including a tapered hole in the surface of the target body; and
  at least a portion of a surface of the tapered hole is reflective;
one or more cameras;
one or more processors; and
one or more computer-readable media storing computer-executable instructions that, when executed by the one or more processors, cause the one or more processors to:
 receive one or more images from the one or more cameras;
 determine one or more filtered pixels having an associated intensity above a threshold from a plurality of pixels of an image of the one or more images captured by the one or more cameras;
 determine a set of pixels of the filtered pixels is associated with the at least one tracking marker of the plurality of tracking markers; and
 generate a motion capture pose for the simulated model based at least in part on a location of the set of pixels of the filtered pixels in the image.

2. The system of claim 1, wherein the motion capture target is one of:
a motion capture prop;
a motion capture suit; or
a tag configured to be affixed to one or more of a motion capture prop or a motion capture suit.

3. The system of claim 1, wherein at least the portion of the surface of the tapered hole that is reflective is a reflective material affixed to the target body and which reflects light in a range of wavelengths that a camera of the one or more cameras is configured to capture.

4. The system of claim 1, wherein the tapered hole is a conical shaped hole in the target body.

5. The system of claim 1, wherein:
a set of tracking markers of the plurality of tracking markers including the at least one tracking marker are arranged on the surface of the target body in a pattern corresponding to the set of tracking markers.

6. The system of claim 1, wherein the plurality of tracking markers further include an external tracking marker that protrudes from a surface of the target body.

7. The system of claim 1, wherein:

the motion capture target is a motion capture prop that is an object in play of a sport and wherein the plurality of tracking markers including the at least one tracking marker are arranged on the surface of the target body such that a use of the motion capture target in play of the sport is not obstructed.

8. The system of claim 1, wherein the at least one tracking marker is a first tracking marker, the set of pixels is a first set of pixels, and the computer-executable instructions further cause the one or more processors to:
   determine a second set of pixels of the filtered pixels is associated with a second tracking marker of the plurality of tracking markers, wherein:
      the generating the motion capture pose for the simulated model is further based at least in part on a second location of the second set of pixels of the filtered pixels in the image.

9. The system of claim 8, wherein:
   the generating the motion capture pose for the simulated model is further based at least in part on:
      a first mapping of the first tracking marker with a first portion of a skeleton of the simulated model; and
      a second mapping of the second tracking marker with a second portion of the skeleton of the simulated model.

10. The system of claim 1, wherein:
   the motion capture target is a first motion capture target;
   a set of first tracking markers of the plurality of tracking markers including the at least one tracking marker are arranged on the surface of the target body in a first pattern corresponding to the set of first tracking markers; and
   the system includes a second motion capture target comprising:
      a second target body;
      a plurality of second tracking markers located on respective portions of the surface of the second target body and associated with respective portions of a second simulated model, wherein:
         at least one second tracking marker of the plurality of second tracking markers is a second concave reflector structure including a second tapered hole in a surface of the second target body;
         at least a second portion of the surface of the second tapered hole is reflective; and
         a set of second tracking markers of the plurality of second tracking markers including the at least one second tracking marker are arranged on the surface of the second target body in a second pattern corresponding to the set of second tracking markers; and
   the computer-executable instructions further cause the one or more processors to:
      determine the set of pixels of the filtered pixels is associated with the at least one tracking marker of the plurality of tracking markers based at least in part on the first pattern; and
      determine a second set of pixels of the filtered pixels are associated with the at least one second tracking marker of the plurality of tracking markers based at least in part on the second pattern.

11. The system of claim 10, wherein the computer-executable instructions further cause the one or more processors to:
   determine an interaction between the simulated model and a second simulated model based on the location of the set of pixels of the filtered pixels in the image and a second location of the second set of pixels of the filtered pixels in the image.

12. The system of claim 1, wherein:
   a set of tracking markers of the plurality of tracking markers including the at least one tracking marker are arranged on the surface of the target body in a pattern corresponding to the set of tracking markers; and
   the computer-executable instructions further cause the one or more processors to:
      determine an orientation of a portion of a skeleton of the simulated model based at least in part on an orientation of the pattern of the set of tracking markers of the plurality of tracking markers; and
      wherein the generating the motion capture pose is further based at least in part on the orientation of the portion of the skeleton.

13. The system of claim 1, wherein:
   the image is a first image from a first camera of the one or more cameras;
   the set of filtered pixels are one or more first filtered pixels;
   the one or more images further include a second image from a second camera of the one or more cameras; and
   the computer-executable instructions further cause the one or more processors to:
      determine one or more second filtered pixels having an associated second intensity above the threshold from a second plurality of pixels of the second image;
      determine a second set of pixels of the second filtered pixels is associated with the at least one tracking marker of the plurality of tracking markers; and
      determine a location of the at least one tracking marker based at least in part on the location of the first set of pixels in the first image and a location of the second set of pixels in the second image.

14. A motion capture target comprising:
   a target body; and
   a plurality of tracking markers located on respective portions of a surface of the target body, wherein:
      at least one tracking marker is a concave reflector structure including a tapered hole in the surface of the target body; and
      at least a portion of a surface of the tapered hole is reflective.

15. The motion capture target of claim 14, wherein the motion capture target is one of:
   a motion capture prop;
   a motion capture suit; or
   a tag configured to be affixed to one or more of a motion capture prop or a motion capture suit.

16. The motion capture target of claim 14, wherein at least the portion of the surface of the tapered hole that is reflective is a reflective material affixed to the target body and which reflects light in a range of wavelengths that a camera of a motion capture system is configured to capture.

17. The motion capture target of claim 14, wherein the tapered hole is a conical shaped hole in the target body.

18. The motion capture target of claim 14, wherein:
   a set of tracking markers of the plurality of tracking markers including the at least one tracking marker are arranged on the surface of the target body in a pattern corresponding to the set of tracking markers.

19. The motion capture target of claim 14, wherein the plurality of tracking markers further include an external tracking marker that protrudes from a surface of the target body.

20. The motion capture target of claim 14, wherein the motion capture target is a motion capture prop that is an object in play of a sport and wherein the plurality of tracking markers including the at least one tracking marker are arranged on the surface of the target body such that a use of the motion capture target in play of the sport is not obstructed.

\* \* \* \* \*